(12) United States Patent
Hügel

(10) Patent No.: US 11,303,052 B2
(45) Date of Patent: Apr. 12, 2022

(54) INTERCONNECTION ASSEMBLY FOR DATA COMMUNICATION

(71) Applicant: HUBER+SUHNER AG, Herisau (CH)

(72) Inventor: Ulf Hügel, Herisau (CH)

(73) Assignee: HUBER+SUHNER AG, Herisau (CH)

(*) Notice: Subject to any disclaimer, the term of this patent is extended or adjusted under 35 U.S.C. 154(b) by 214 days.

(21) Appl. No.: 16/642,098

(22) PCT Filed: Sep. 26, 2018

(86) PCT No.: PCT/EP2018/076166
§ 371 (c)(1),
(2) Date: Feb. 26, 2020

(87) PCT Pub. No.: WO2019/072571
PCT Pub. Date: Apr. 18, 2019

(65) Prior Publication Data
US 2020/0212611 A1 Jul. 2, 2020

(30) Foreign Application Priority Data

Oct. 9, 2017 (CH) .................................. 01293/17

(51) Int. Cl.
*H01Q 1/38* (2006.01)
*H01R 12/75* (2011.01)
(Continued)

(52) U.S. Cl.
CPC ........... *H01R 12/75* (2013.01); *H01Q 1/2283* (2013.01); *H01Q 1/38* (2013.01); *H01Q 13/24* (2013.01);
(Continued)

(58) Field of Classification Search
CPC ........ H01Q 1/2283; H01Q 1/38; H01Q 13/24; H01Q 21/06; H01Q 21/064; H01Q 19/08;
(Continued)

(56) References Cited

U.S. PATENT DOCUMENTS 6,201,508 B1 * 3/2001 Metzen ............. H01Q 13/0258
343/776
2009/0309674 A1 12/2009 Girard et al.
(Continued)

FOREIGN PATENT DOCUMENTS

CN 201877632 U 6/2011
CN 106921087 A 7/2017
(Continued)

OTHER PUBLICATIONS

China Patent Office, Office Action and Search Report for Chinese Patent Application 201880065381.8, dated Oct. 13, 2020.
(Continued)

*Primary Examiner* — Hai V Tran
(74) *Attorney, Agent, or Firm* — Pauley Erickson & Swanson

(57) ABSTRACT

An interconnection assembly for a switching device includes at least one cable with a core having a first dielectric material at least partially surrounded by a second dielectric material having a refractive index different from the first dielectric material. A first connector part is positioned with respect to an antenna and includes a fan-out element and at least one hollow conductor arranged between the antenna and the core of the cable wherein the hollow conductor extends in the fan-out element to guide a signal between the antenna and the core of the cable, wherein the hollow conductor includes a first port aligned with the antenna and a second port, and when. assembled is in communication with the core of the cable, At least one second connector part is interconnected to position the core of the cable in a connected position relative to the second port of the hollow conductor.

21 Claims, 5 Drawing Sheets

(51) Int. Cl.
*H01R 13/512* (2006.01)
*H01R 13/518* (2006.01)
*H01Q 1/22* (2006.01)
*H04Q 11/00* (2006.01)
*H01Q 21/06* (2006.01)
*H01Q 21/00* (2006.01)
*H01Q 13/24* (2006.01)

(52) U.S. Cl.
CPC ............. *H01Q 21/00* (2013.01); *H01Q 21/06* (2013.01); *H01R 13/512* (2013.01); *H01R 13/518* (2013.01); *H04Q 11/0005* (2013.01); *H01R 2201/02* (2013.01); *H04Q 2011/0052* (2013.01)

(58) Field of Classification Search
CPC .. H01Q 21/068; H01Q 21/00; H04Q 11/0005; H04Q 2011/0052; H01R 2201/02; H01R 12/75; H01R 13/512; H01R 13/518
USPC ........................................................ 343/772
See application file for complete search history.

(56) References Cited

U.S. PATENT DOCUMENTS

| | | | |
|---|---|---|---|
| 2015/0322759 A1* | 11/2015 | Okoniewski | E21B 43/2401 166/60 |
| 2015/0357761 A1* | 12/2015 | Wanha | H01R 13/6461 439/78 |
| 2016/0240907 A1 | 8/2016 | Haroun | |
| 2017/0098889 A1 | 4/2017 | Henry et al. | |
| 2019/0123447 A1* | 4/2019 | Arnold | H01P 1/045 |

FOREIGN PATENT DOCUMENTS

| | | |
|---|---|---|
| WO | WO 2016/072986 A1 | 5/2016 |
| WO | WO 2017/158020 A1 | 9/2017 |

OTHER PUBLICATIONS

EPO (Riswijk, NL), English language version of the International Search Report, Form PCT/ISA/210, for International Application PCT/EP2018/076166, Dec. 13, 2018 (3 pages).

* cited by examiner

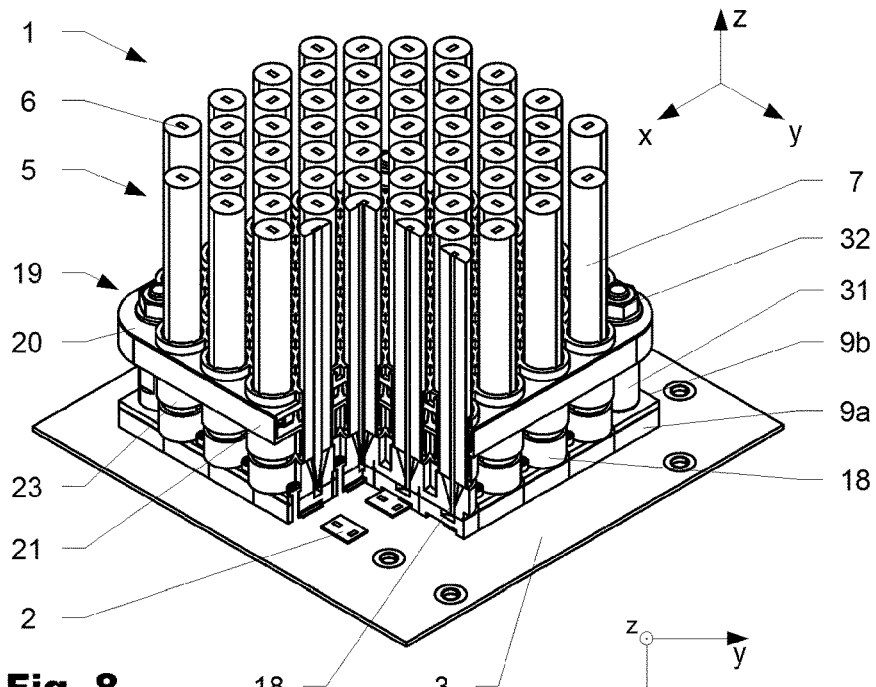
Fig. 8
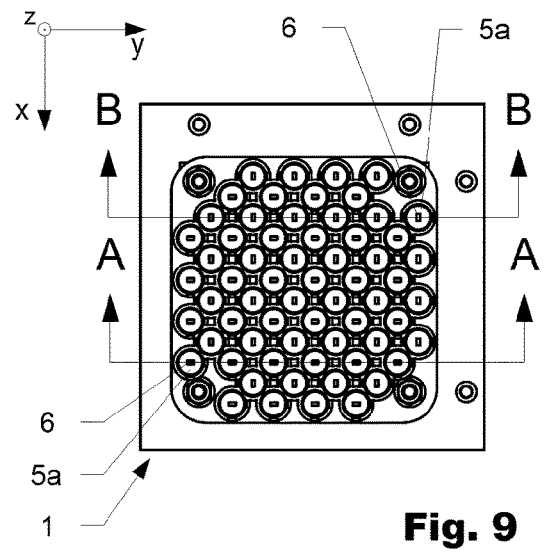
Fig. 9
Fig. 10
Fig. 11
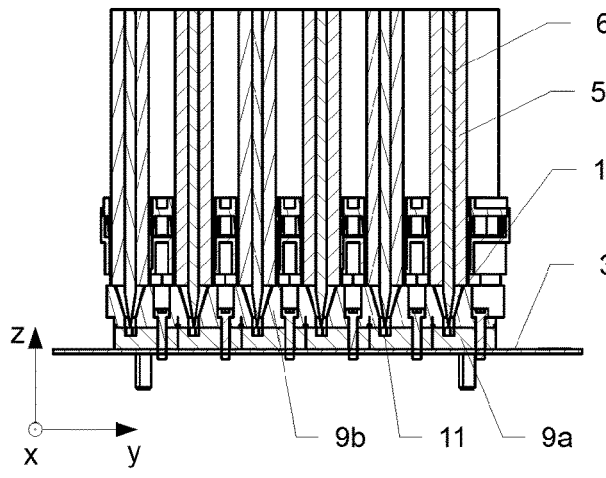
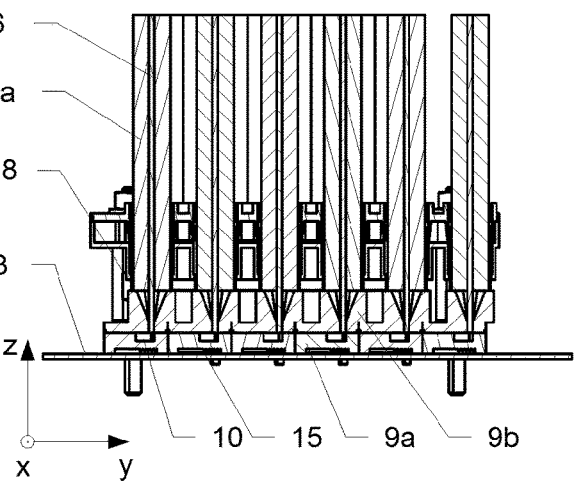

INTERCONNECTION ASSEMBLY FOR DATA COMMUNICATION

BACKGROUND OF THE INVENTION

Field of the Invention

The present invention relates to an interconnection assembly according to the preamble of patent claims.

Discussion of Related Art

For interconnecting switches, optical transmission lines are used for best performance. One cost driving factor is that each optical line needs an SFP-Module (Small Form-factor-Pluggable-Module)). The SFP-Module is a compact optical module transceiver used for both telecommunication and data communications applications. SFP-Modules are comparatively expensive.

SUMMARY OF THE INVENTION

It is an object of the invention to provide an improved way to transfer data between at least two electronic devices in a server room or the like, namely switches, servers, etc., in particular on the principle of the dielectric waveguide.

According to the invention, an interconnection assembly, such as for a switching device in a server room, comprises at least one cable with a core made from a first dielectric material. In a variation, the cable core is at least partially surrounded by (encompassed by) a second dielectric material having a different, preferably lower, refractive index than the first dielectric material. In a variation, the cable core is surrounded by at least one layer comprising the second dielectric material. In a variation, the second dielectric material is contained in a cable jacket surrounding the cable core and/or is contained in a coating of the cable core. In a variation, the cable jacket may comprise one or several layers comprising the same or different second dielectric materials. The cable is, for example, a dielectric waveguide. The interconnection assembly comprises a first connector part that is positioned with respect to at least one antenna and comprises a fan-out element comprising, per antenna, at least one hollow conductor arranged between the antenna and the cable core. The hollow conductor extends in the fan-out element to guide a signal between the antenna and the cable core. The hollow conductor comprises a first port aligned with the antenna and a second port, which in an assembled position is in communication with the cable core. The interconnection assembly further comprises at least one second connector part that is interconnected to the cable and positions the cable core into a connected position with respect to the second port of the hollow conductor. The interconnection assembly advantageously allows robust positioning of the at least one cable and cable core with respect to the at least one antenna for signal transmission between the antenna and the cable having with minimal signal degradation and power loss.

In a variation, the interconnection assembly comprises a plurality of cables each with a core made from a first dielectric material, wherein each cable core is at least partially surrounded by another material comprising a second dielectric material having a different, preferably lower, refractive index than the first dielectric material. In a variation, each cable core is surrounded by at least one layer comprising the second dielectric material. In a variation, the at second dielectric material of each cable is contained in a cable jacket surrounding the respective cable core and/or is contained in a coating of the respective cable core. In a variation, the cable jacket of each cable may comprise one or several layers comprising the same or different second dielectric materials. The first connector part is positioned with respect to a plurality of antennas and comprises a fan-out element comprising, per antenna, at least one hollow conductor arranged between the antenna and a respective cable core, whereby each hollow conductor comprises a first port aligned with an antenna of the plurality of antennas and a second port, which in an assembled position is in communication with a respective cable core of the plurality of cables. Here, the interconnection assembly comprises a second connector part interconnected to each cable and positions the core of said cable into a connected position with respect to the second port of a hollow conductor of the fan-out element. The interconnection assembly advantageously allows precise positioning of the plurality of cables and their cable cores with respect to the plurality of antennas for high grade signal transmission between the antennas and the cables with minimal signal degradation and power loss. In addition, a high packing density of interconnected antennas and cables is achieved. This is a particular advantage at high signal frequencies where distances from chip-boards to the cables of the interconnection assembly are preferably kept to a minimum.

In a variation, a plurality of interconnection assemblies are provided that are arranged next to each other, preferably on a common PCB (Printed Circuit Board).

If appropriate, the fan-out element of the first connector part comprises a first plate element with an upper face and a second plate element interconnected to the first plate element at the upper face of the first plate element. Preferably, the hollow conductor comprises an opening extending at least partially along the upper face. Preferably, the second port of the hollow conductor is contained in the second plate element.

In a variation, the second port is funnel-shaped. It was found that this reduces signal reflection, power loss and impedance at the site of signal transfer between the cable core and the hollow conductor. The second port having a funnel shape maintains alignment of the cable core with the section of the hollow conductor extending at least partially along the upper face of the first plate element.

The core of the at least one cable may extend beyond the jacket at a cable end, thereby facilitating direct signal transfer between the cable core and the hollow conductor resulting in reduced power loss, impedance and signal reflection. In a variation, the core of the at least one cable reaches into the second port of the hollow conductor.

The second connector part may comprise a cable insertion rack comprising at least one opening through which the at least one cable extends. The opening facilitates alignment of the at least one cable with the respective hollow conductor and helps maintain the at least one cable in position. Good results can be achieved when the at least one cable is fixed to the cable insertion rack, thereby further stabilizing the positioning of the at least one cable. In a variation where the at least one cable comprises a cable jacket, stable fixing can be achieved when the cable jacket is interconnected to the cable insertion rack. The cable insertion rack may comprise a lower part and an upper part which are interconnected to each other. Preferably, both upper and lower parts comprise at least one opening through which the at least one cable extends, thereby further stabilizing its positioning.

For stably positioning the cable insertion rack of the second connector part in the mounted position, the cable insertion rack can be interconnected directly or indirectly to the fan-out element of the first connector part by fixing means, e.g. at least one bolt.

Good results are achieved when the at least one antenna is covered by a recess of the fan-out element and the first port of the hollow conductor is arranged in the recess. This facilitates low-impedance signal transfer to and from the antenna and helps to reduce signal and power loss.

A particularly effective design can be achieved when the at least one antenna is arranged on a chip and/or on a PCB. In a variation, the at least one antenna is arranged on a chip mounted on a PCB. A plurality, in particular two antennas may be arranged on the chip and/or the PCB. Preferably, pairs of antenna are arranged on a chip and/or on a PCB whereby a first antenna of the pair transmits signals and a second antenna of the pair receives signals.

In a variation, the interconnection assembly comprises two or more cables arranged in a pattern, thereby increasing signal channel density. Two neighboring cables can be, with respect to their longitudinal axis (z), arranged with a difference of 90° in angular position relative to each other. This helps to minimize the potential of signal interference between two neighboring cables. Good results are achieved when the core of the at least one cable has a rectangular cross section.

For interconnection of the at least one cable with a counterpiece, for example with the second connector part, in particular with a cable insertion rack, the end of the at least one cable may be equipped with an attachment sleeve. The attachment sleeve may comprise an orientating means to define the orientation of the cable or its angular position with respect to its longitudinal axis.

The fan-out element can be interconnected directly or indirectly to a structure of a PCB by means of at least one fixing member, such as a rod, bolt or bushing, wherein the fixing member is arranged on said structure. The structure on the PCB may comprise a liquefiable material. In a variation, the PCB comprises a bore and the structure of the PCB is arranged on or adjacent the bore. The liquefiable material of the structure of the PCB may be liquefiable by heat treatment, for example a solderable metal or solderable plastic. In a variation, the at least one fixing member may also comprise a liquefiable material that may be liquefiable by heat treatment, for example a solderable metal or plastic. The fixing member may comprise the same or different material as the structure on the PCB. Preferably, the fixing member and the structure on the PCB comprise the same material. Preferably, the fixing member is aligned with the structure on the PCB. This may be achieved by self-alignment of the fixing member with the structure on the PCB during a liquifying process, for example during heat treatment, in particular during soldering. In particular, said fixing member is foreseen to seek a centered position with respect to the structure of the PCB according to the surface tension of the liquified material of the structure of the PCB and/or the fixing member.

In a method for the manufacture of an embodiment of an interconnection assembly element, in an aspect, a first connector part comprising at least one hollow conductor extending in the fan-out element to guide an electromagnetic signal between an antenna arranged on a PCB and the core of a cable is positioned with respect to the antenna, wherein said hollow conductor comprises a first port to be aligned with the at least one antenna and a second port to be arranged in communication with the core of the cable, whereby one end of a fixing means such as a rod, bolt or a bushing is fixedly interconnected to the first connector part and another end of the fixing means is connected to a structure of the PCB comprising a liquefiable material, whereby the structure of the PCB of liquified such that, affected by the surface tension of the liquid phase of the structure of the PCB, the fixing means is centered on the structure of the PCB. Preferably, liquifying the structure of the PCB is at least partly achieved by heat treatment.

In a variation of the method, a second connector part comprising at least one cable guide for a cable is arranged on the first connector part such that the core of the cable is positioned in communication with respect to the second port of the hollow conductor of the first connector part.

In a variation of the method, the fixing means comprises a liquefiable material, such that when the fixing means is interconnected with the structure of the PCB, both the structure of the PCB and the fixing means are at least partially liquified, whereby affected by the surface tension of the liquid phase of the structure of the PCB and the fixing means, the fixing means is centered on the structure of the PCB and interconnected thereto.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification.

BRIEF DESCRIPTION OF SEVERAL VIEWS OF THE DRAWINGS

The herein described invention will be more fully understood from the detailed description given herein below and the accompanying drawings which should not be considered limiting to the invention described in the appended claims, whereby:

FIG. 8 is a perspective view of the completed interconnection assembly shown in FIG. 1;

FIG. 9 is a top view of the interconnection assembly shown in FIG. 7;

FIG. 10 is a view of cross-section A-A indicated in FIG. 8 showing a first cable orientation FIG. 11 is a view of cross-section B-B indicated in FIG. 8 showing a second cable orientation

DETAILED DESCRIPTION OF THE INVENTION

Reference will now be made in detail to certain embodiments, examples of which are illustrated in the accompanying drawings, in which some, but not all features are shown. Whenever possible, like reference numbers will be used to refer to like components or parts.

Figure 1:
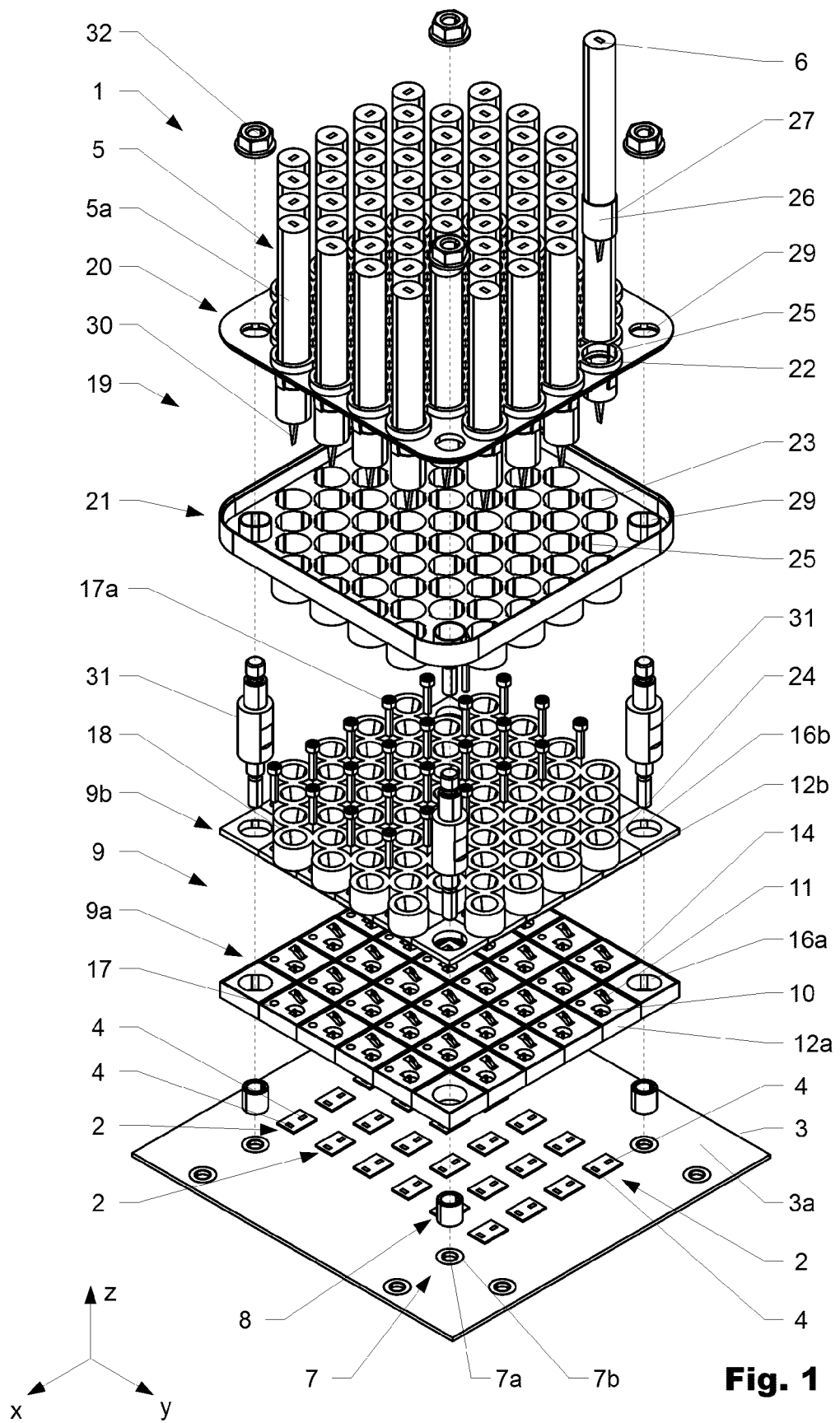
FIG. 1 is an exploded view of an interconnection assembly embodiment.

FIG. 1 shows an interconnection assembly 1 for connecting an array of chips 2, on which antennae 4 are mounted, to a plurality of cables 5. The chips 2, for example MMICs (Monolithic Microwave Integrated Circuit), are mounted on a PCB 3. The antennae 4 are foreseen to send and receive, to and from the cables 5, signals of up to 140 GHz. The cables 5 are dielectric waveguides each comprising a cable core 6 surrounded by a cable jacket 5a whereby the cable core 6 and cable jacket 5a have differing refractive indexes. The PCB 3 comprises a plurality of alignment structures 7 surrounding bores 7a in the PCB 3, wherein each bore 7a is surrounded by a liquefiable, in particular solderable material 7b such as metal or plastic. The liquefiable material 7b takes the form of a ring whose inner contour is adjacent the opening of the bore 7a. In an embodiment, the liquefiable material extends down to the inner surface of the bore. Fixing means, here shown as alignment bushings 8, are provided to be joined to the liquefiable material 7b. As a head side of a bushing 8 is placed on the liquefiable material 7b, it is heat-treated to melt, for example by soldering, whereby the liquefiable material 7b and, depending on the material of the bushing, the head side of the bushing 8 facing the upper surface of the PCB 3 are partially melted. During this time and the following cooling phase, the bushings 8 naturally align with and are joined to the material 7a. At the opposite head side of each bushing facing away from the PCB, it is provided with a bore or other attachment means to receive the end of fixing bolt 31. Instead of alignment bushings 8, however, alignment rods or other fixing means can be used that abut and are joined with the liquefiable material 7b via heat treatment and which preferably comprises means for engaging with the ends of fixing bolts 31.

FIG. 1 further shows a first connector part 9 comprising a first plate element 9a and a second plate element 9b. The first connector part 9 comprises a fan-out element including an array of hollow conductor pairs operatively arranged above the antennae 4 of the chips for receiving and transmitting signals from and to the antennae 4. The hollow conductors follow a curved path within the first plate element 9a and channel microwave signals through the first plate element 9a from its underside 13 to its upper side 14. The first plate element 9a is subdivided into an array of tile sub-units 12a. A pair of hollow conductors is arranged in each tile sub-unit 12a.

Figure 2:
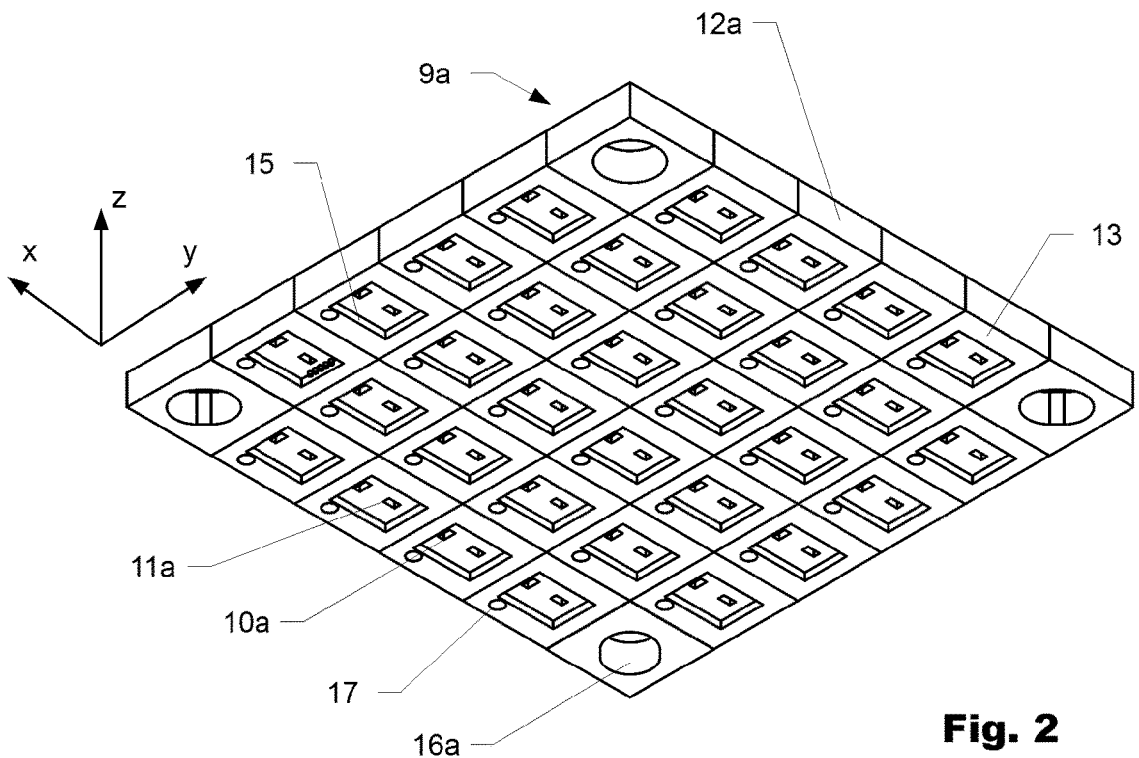
FIG. 2 is a perspective view of the underside of a first plate element of the first connector part of the assembled interconnection assembly embodiment according to FIG. 1.
Figure 3:
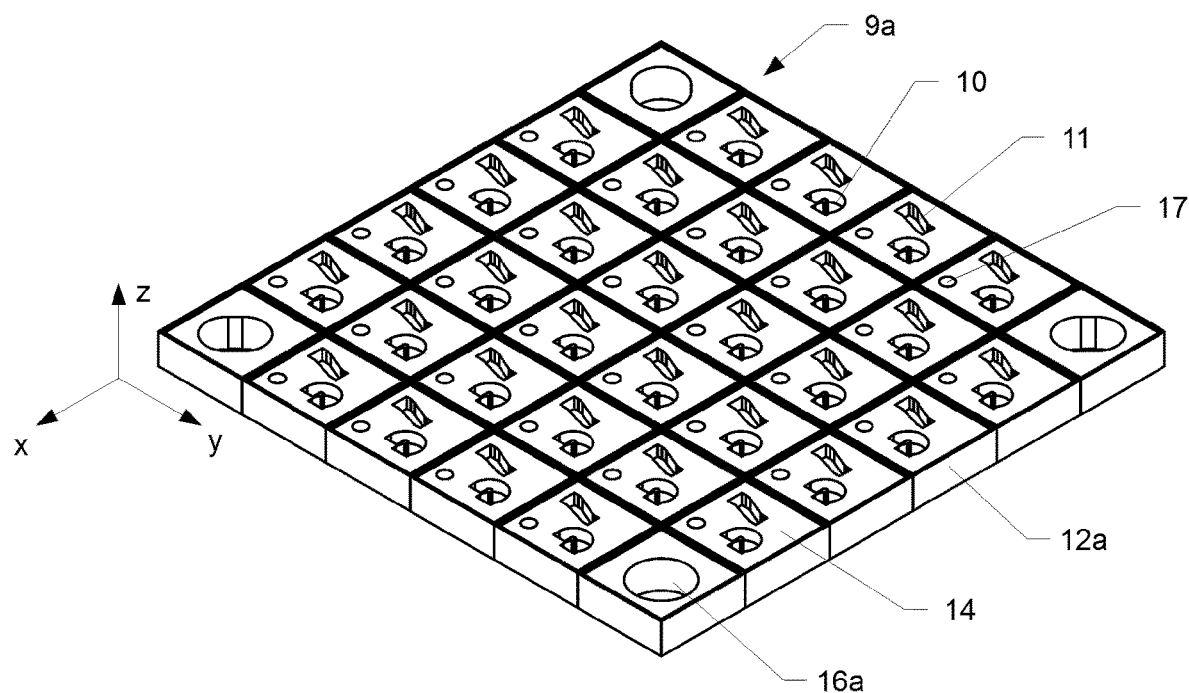
FIG. 3 is a perspective view of the upper side of the first plate element according to FIG. 2.

In the aligned and stacked arrangement of the first and second plate elements 9a and 9b of the first connector part 9, the fan-out element is at least partly constituted by the underside openings (shown in FIG. 2) of the hollow conductors or first ports in the first plate element 9a, these being aligned with the antennae 4, and the hollow conductors and their openings 10, 11 on the upper side of the first plate element 9a (shown in greater detail in FIG. 3). The fan-out element is additionally constituted by cable core receiving receptacles or second ports 18 (see FIG. 4) of the second plate element 9b, these being in communication with the core of the cables 5. The first ports, hollow conductors and seconds ports are aligned to each other so as to create channel pairs through which the signals to and from the antennae 4 propagate, preferably with 90° difference in polarization. Passing through each tile sub-unit 12a, 12b of the first plate element 9a and second plate element 9b therefore is a pair of channels for channeling two signals with 90° difference in polarization. In addition, the first and second plate elements 9a and 9b comprise fixing bores 16a, 16b in their corner regions, for example a fixing bore 16a, 16b in each corner tile sub-unit. Fixing rods or bolts 31 are passed through the bores 16a, 16b and engage the fixing means 8, in particular the alignment bushings 8 on the PCB 3.

A second connector part 19 is shown in FIG. 1 which is interconnected with the cables 5, thereby positioning the cable cores 6 in a connected position with respect to the cable core receiving receptacles or second ports 18 of the hollow conductors of the first connector part comprising the fan-out element. In an embodiment, the second connector part 19 comprises an upper cable insertion rack 20 and a lower cable insertion rack 21, each with cable guides 22, 23 for guiding the cables 5 and their cores 6 to the cable core receiving receptacles 18 or second ports 18 of the first connector part 9. Both cable insertions racks 20 and 21 comprise bores 29 in their corner regions through which the fixing bolts or rods 31 are passed. Additional details of the second connector part 19 can be derived from FIG. 5 and its description. Each fixing bolt 31 is terminated at its upper end with a screw 32, the lower surface of which, when tightened, rests on the upper surface of the upper cable insertion rack 20, thereby joining the first and second connector parts 9, 19 and the PCB 3 together in a tight and aligned fit.

The exact alignment of the first connector part 9 with the PCB 3 and the chips 2 mounted thereon, facilitated by the joining of the structures 7 on the PCB and the fixing means 8 of the first connector part, allows the cable cores 6 to be inserted into the first connector part and to be coupled to the fan-out element with minimal signal degradation. This is achieved without requiring individual and precise direct connection between the cable cores 6 and the antennae 4. The fan-out element comprising the hollow conductors, their openings on the underside (first ports) and upper side of the first plate element 9a and the cable core receiving receptacles 18 provides some tolerance for the positioning of the cable cores 6 without signal degradation. Because the cables 5 are securely fixed in place by means of the second connector part 19 including the cable guides and the fixing bolt 31 and screw 32, they are robust against external mechanical forces and their cores maintain clean signal coupling with the antennae 4 despite these forces.

As a result of the fan-out element allowing a dense array of chips 2 to be coupled with the dielectric waveguide cables 5, an interconnection assembly with 256 pairs of cables S can be provided, for example for applications where servers are used with a dense packing of i/o channels and ports. Signal coupling and transmission is achieved within 4 inches between the antennae 4 and the dielectric waveguide cables 5, which is considered to be the limit of the length of signal transmission for high frequency applications.

To facilitate the handling of bundles of dielectric waveguide cables, eight modules, each consisting of sixty-four inserted cables can be provided next to each other to create the 256 cable pair interconnection assembly, i.e. a 512 cable interconnection assembly. To that end, eight first connector parts 9 (eight first and second plate elements 9a and 9b) and eight second connector parts 19 (eight upper and lower cable insertion racks) are arranged next to each other and preferably mounted on a common PCB. As dielectric waveguide cables 5 are used in the present interconnection assembly, costs can be significantly lowered compared to interconnection assemblies comprising fibre optic cables.

In addition, the following technical advantages can be achieved:
- a relatively compact, approx. 40,000 mm$^2$, i.e. 155 mm$^2$/per chip interconnection surface area for a module consisting of sixty-four cables,
- an edge-on or broad-side breakout of cables,
- front or top panel routing options,
- multi-waveguide connectors with sizes compatible to QSFP+(Quad Small Form-factor Pluggable (QSFP) or similar)

FIG. 2 shows the underside of the fan-out element of the first connector part 9, in particular the underside of the first plate element 9a shown in FIG. 1 facing the antennae 4. Emerging at the underside of the first plate element 9a, each hollow conductor has an underside opening 10a or 11a facing or covering an antenna 4. In the present document, these underside openings 10a, 11a are also referred to more generally as first ports. Emerging on the upper side 14 of the first plate element 9a (see FIGS. 1 and 3) facing the cables 5, each hollow conductor has an upper side opening 10 or 11 facing the end of a cable 5. The underside openings 10a or 11a of the hollow conductors are preferably shaped to complement the shape of the antenna 4 they cover. For example, the underside opening 10a or 11a of each hollow conductor is rectangular. The orientations of the underside openings 10a and 11a of the hollow conductors per tile sub-unit 12a preferably differ by 90° and match the preferred orientation of the antennae 4 on each chip 2 along with the orientation, angular position with respect to the longitudinal axis (z), of the cables 5. Preferably, the hollow conductors of the fan-out element follow a divergent path curving from their underside openings 10a or 11a toward the edges of the tile sub-units 12a on the upper side 14 of the first plate element (see FIG. 3). The fanning-out in this manner of the hollow conductors enables signaling between a high density arrangement of chips 2 and their respective antennae on the PCB and the cables 5. In an embodiment, the underside 13 of the first plate element 9a comprises an array of recesses 15 shaped to complement the outer contour of the chips 2 on the PCB 3 which they face and cover. Preferably, the underside openings 10a and 11a of a pair of hollow conductors both emerge in such a recess.

FIG. 3 shows the upper side 14 of the first plate element 9a of the first connector part 9. The upper side opening 10 of a first hollow conductor of each hollow conductor pair has a shape differing from that of the upper side opening 11 of the second hollow conductor of the pair. Here, the upper side opening of the second hollow conductor 10 is curled or spiral-shaped, for example in the manner of a spirula shell, while the upper side opening 11 of the first hollow conductor is wave-shaped. The first plate element 9a further comprises corner tile sub-units each comprising a bore 16a. The bores 16a receive the upper head ends of the fixing means 8 such that the first plate element 9a and the underside openings 10a and 11a of the hollow conductors can be aligned to the chips 2 and their antennae 4. In an embodiment, each tile sub-unit 12a of the first plate element 9a preferably with the exception of the corner tiles further comprises an alignment bore 17 into which a bolt or screw 17a (see FIG. 7 for a detailed view) can be inserted that also passes through a corresponding alignment bore 17b of the second plate element 9b. FIG. 3 shows the first plate element 9a as consisting of an array of interconnected tile sub-units 12a, but this is not a requirement. Alternatively, the first plate element 9a may comprise a continuous structure in which recesses 15, underside openings 10a and 11a of the hollow conductors, hollow conductors and their upper side openings 10 and 11 form a part of the fan-out element of the first connector part 9 along with the alignment bores 17 all being arranged in a regular pattern, preferably a grid-like pattern.

Figure 4:
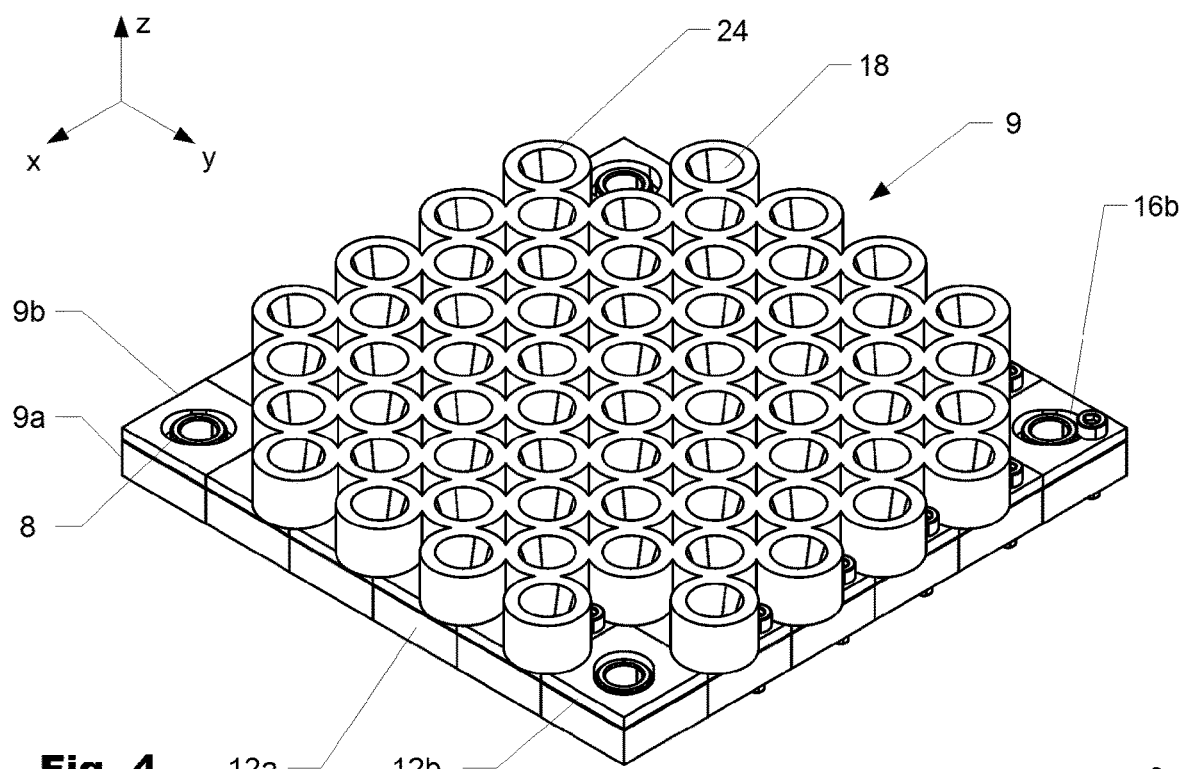
FIG. 4 is a perspective detail view of the first connector part comprising first and second plate elements shown separately in FIG. 1.

FIG. 4 shows the first connector part 9 with the fan-out element comprising the second plate element 9b joined to the first plate element 9a. The second plate element 9b comprises, on its upper side facing the cables 5, an array of cable core receiving receptacles or second ports 18. These may be funnel shaped. In the present document, these receptacles 18 are also referred to more generally as second ports. Analogous to the first plate element 9a shown in FIG. 2, the second plate element 9b comprises an array of tile sub-units 12b. At least two cable core receiving receptacles 18 are positioned on and overlay each tile sub-unit 12b of the second plate element 9b, whereby their orientations with respect to the z-axis differ by 90°. The underside of one cable core receiving receptacle 18 meets the upper side opening 10 of a hollow conductor of the first plate element 9a, for example the spiral-shaped upper side opening 10 shown in FIG. 3. The underside of another cable core receiving receptacle 18 meets the upper side opening 11 of another hollow conductor, for example the wave-shaped upper side opening 11 shown in FIG. 3. The cable core receiving receptacle 18 serves to transfer signals between the cable core 6 and the upper side openings 10 and 11 of the hollow conductors. As the first and second plate elements 9a and 9b of the first connector part 9 are stacked, the fan-out element of the first connector part includes the openings (first ports) of the hollow conductors on the underside 13 of the first plate element 9a, the openings of the hollow conductors on the upper side 14 of the first plate element 9a, the hollow conductors themselves and the cable core receiving receptacles (second ports) of the second plate element 9b.

Figure 5:
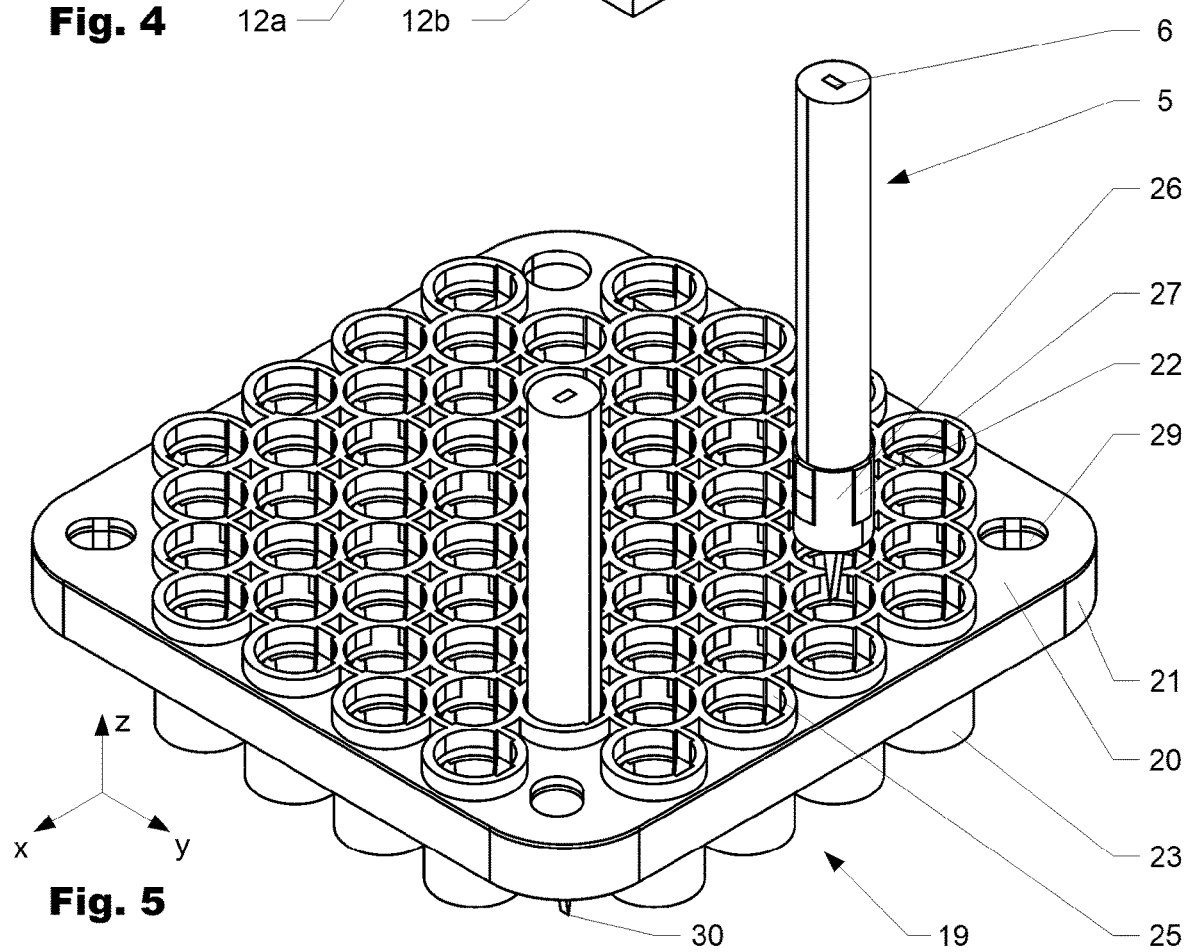
FIG. 5 is a perspective detail view of the second connector part comprising upper and lower cable insertion racks shown separately in FIG. 1.

FIG. 5 is a perspective view onto the second connector part 19 comprising the lower and upper insertion racks 21 and 20 joined together. Two cables 5 are shown comprising attachment sleeves 26 near their insertion ends. The attachment sleeves 26 comprise raised sections 27 on their outer surfaces which extend in the longitudinal direction of the cables 5. In this embodiment, each attachment sleeve 26 comprises two such raised sections 27 arranged at different angular positions along the circumference of the attachment sleeve 26. The first cable 5 comprises two raised sections 27 arranged along the outer surface of the attachment sleeve with 90° separation from one another. The second cable 5 shown comprises two raised sections 27 arranged along the outer surface of the attachment sleeve with 180° separation from one another. In this manner, neighboring cables 5 can be inserted which transmit signals with different polarization, preferably with 90° difference. In addition, each cable can comprise an attachment sleeve clip to securely engage with the second connector part, in particular with the upper and lower insertion racks 21 and 20. Further, fixing bores 29 are provided in the corner regions of the lower and upper insertion racks 20, 21 so they are aligned when stacked. FIG. 5 also shows the tapered shape of the cable core insertion tip 30 emerging from the jacketed section of the cable 5. The cable core end 30 for insertion into the interconnection assembly 1 may be tapered for easier insertion into the first connector part but this is not a requirement and it may instead be blunt.

Figure 6:
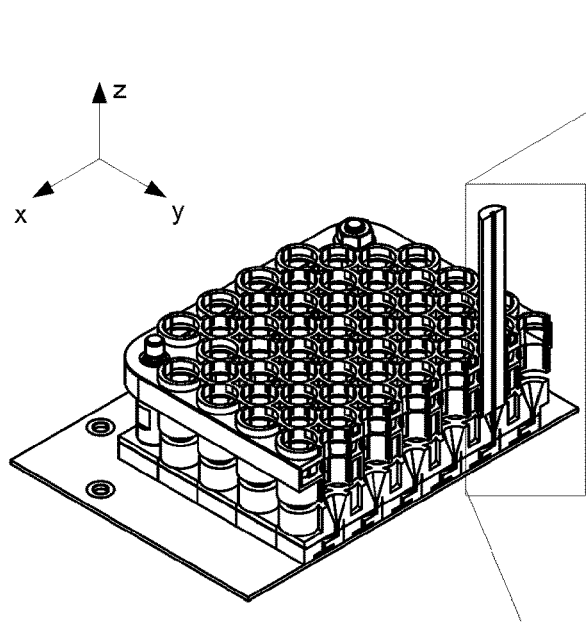
FIG. 6 is a perspective detail view of the first and second connector parts together including a cross-section showing the interior of the fan-out element, in particular of a first hollow conductor.

FIG. 6 is a close-up perspective view of a part of the interconnection assembly 1 including the PCB 3, the first connector part 9 comprising first and second plate element 9a, 9b and a second connector part 19 comprising a cable insertion racks 20 and 21, whereby a cross-section is open to view, in order from bottom to top, the recesses 15 on the underside of the first plate element 9a, the first ports or underside openings 11a of one of the pair of hollow conductors 11c merging into said recesses, the conductor path formed by one of the hollow conductors 11c, the wave-shaped opening 11 of the hollow conductor on the upper side of the first plate element 9a, the cable core receiving receptacles or second ports 18 of the second plate element 9b, the cable cores 6 inserted into the second ports 18 and the cable jackets 5a surrounding each cable core 6. In addition, a second connector part 19 comprising a cable insertion racks 20 and 21 with cable guides arrays 22 and 23 to receive and guide the cables 5. With reference to the lower cable insertion rack 21, the cables 5 are inserted through the cable guides 23 and the ends of the cable jackets 5a abut the upper opening of the second ports 18, i.e. the lip 24 of the second port 18, such that the cable 5 cannot be inserted further. The lip 24 of the second port 18 serves as a seat on which the head side of each cable jacket 5a rests. Each of the cable guides 23 in the lower insertion rack 21 comprises, along its inner surface, at least one groove 25 extending in the longitudinal direction of the cables 5 for receiving the raised sections 27 of the attachment sleeves of 26 of the cables only when the cable 5 is in the required orientation or angular position with respect to its longitudinal axis (as shown in FIG. 5).

Figure 7:
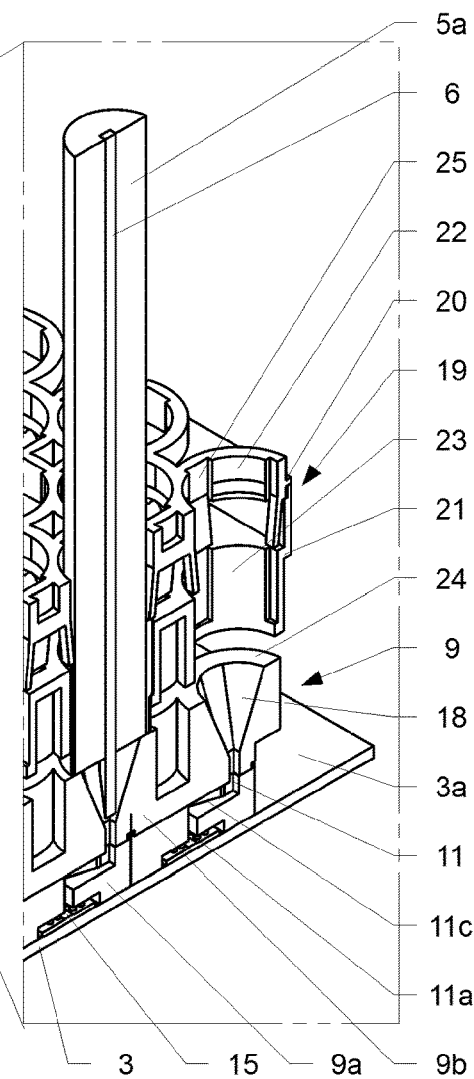
FIG. 7 is a perspective detail view of the first and second connector parts together including a cross-section showing the interior of the fan-out element, in particular of a second hollow conductor.
Figure 7:
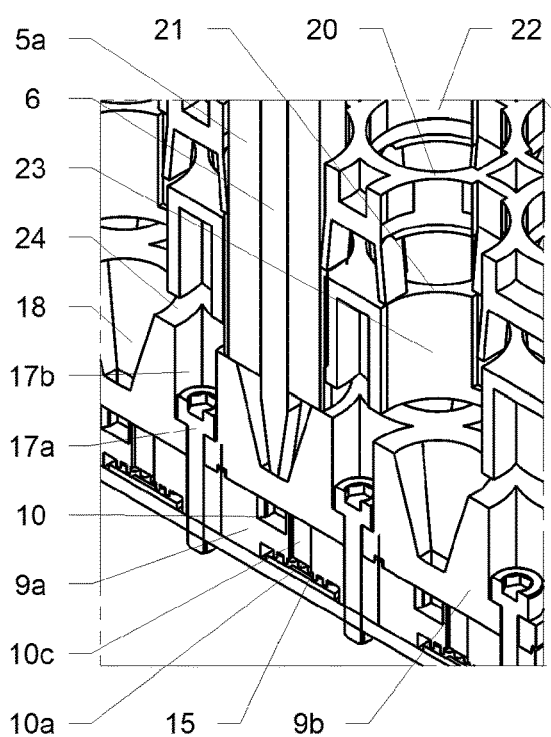
Figure 7:
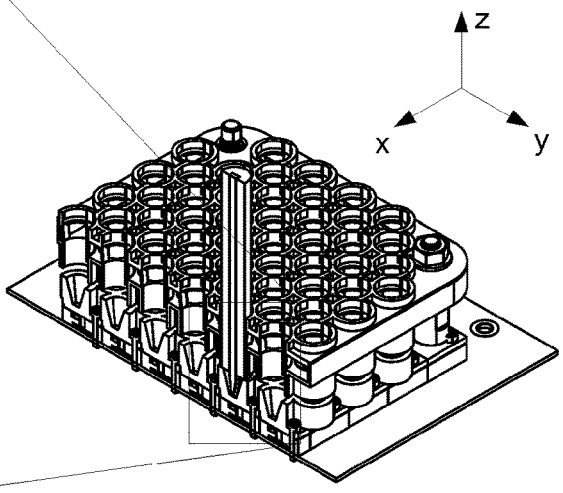

FIG. 7 is a close-up perspective view of a part of the interconnection assembly 1 differing from FIG. 6 in that the cross-section of second hollow conductors 10c and their openings 10a and 10 on the lower and upper sides of the first plate element 9a are shown. The upper side opening 10 of this hollow conductor is spiral shaped as shown in FIG. 3. The polarization of the signal channel through these hollow conductors 10c preferably differs by 90° from the polarization of the hollow conductors 11c whose cross sections are shown in FIG. 6.

FIG. 8 shows the interconnection assembly 1 in its completed state along with, for explanatory purpose, the interiors of the some of the cables 5 showing their cores 6 and the position of the chips 2 underneath the first plate element 9a. The drawing depicts, in a high density and tight arrangement, the proximity in longitudinal direction of the cables guides 23 of the lower insertion rack 21 to the second ports 18 when the fixing bolt 31 has been inserted through the bores 29, 16b, 16a, preferably bore 7a of the PCB and the screw 32 has been wound tight on the opposite end of the fixing bolt.

FIG. 9 is a top view of the interconnection assembly shown in FIG. 1 which shows cross-sectional planes A-A and B-B shown individually in FIGS. 10 and 11.

FIG. 10 shows cable cores 6 of first cable members of cable pairs inserted into the upper side openings 11 of a first hollow conductor in the first plate element 9a.

FIG. 11 shows cable cores 6 of second cable members of cable pairs inserted into the other upper side openings 10 of a second hollow conductor in the first plate element 9a.

The cross sections of the cable cores in FIGS. 10 and 11 shows how their orientations are different depending on which second port 18 and which upper side opening 10 or 11 of the first plate member 9a they are inserted into.

The invention claimed is:

1. An interconnection assembly (1) for a switching device in a server room comprising:
  a. at least one cable (5) with a core (6) comprising a first dielectric material, wherein the core is at least partially surrounded by a second dielectric material having a refractive index different from the first dielectric material;
  b. a first connector part (9) positioned with respect to at least one antenna (4) comprising
    i. a fan-out element comprising per antenna at least one hollow conductor (10c, 11c) arranged between the at least one antenna (4) and the core (6) of the at least one cable (5),
    ii. the at least one hollow conductor (10c, 11c) extending in the fan-out element to guide a signal between the at least one antenna (4) and the core (6) of the at least one cable (5),
    iii. the hollow conductor (10c, 11c) having a first port (10a, 11a) aligned with the at least one antenna (4) and a second port (18), which in an assembled position is in communication with the core (6) of the at least one cable (5); and
  c. at least one second connector part (19) interconnected to the at least one cable (5) positioning the core (6) of the cable (5) in a connected position with respect to the second port (18) of the hollow conductor (10c, 11c).

2. The interconnection assembly according to claim 1, wherein the cable (5) comprises a cable jacket (5a) surrounding the cable core (6).

3. The interconnection assembly according to claim 1, wherein the cable jacket (5a) comprises a second dielectric material having a lower refractive index then the first dielectric material of the cable core (6).

4. The interconnection assembly according to claim 1, wherein the fan-out element comprises a first plate element (9a) and a second plate element (9b) interconnected to the first plate element (9a) in an area of an upper face, wherein in the area of the upper face the hollow conductor (10c, 11c) extends at least partially in a direction of the upper face.

5. The interconnection assembly according to claim 1, wherein the second port (18) is funnel shaped.

6. The interconnection assembly according to claim 1, wherein at a cable end, the core (6) of the at least one cable (5) extends above the cable jacket (5a).

7. The interconnection assembly according to claim 1, wherein the cable core (6) reaches into the second port (18) of the hollow conductor.

8. The interconnection assembly according to claim 1, wherein the second connector part (19) comprises a cable insertion rack comprising at least one opening through which the at least one cable (5) extends.

9. The interconnection assembly according to claim 8, wherein the at least one cable (5) is fixed to the cable insertion rack (20, 21).

10. The interconnection assembly according to claim 8, wherein the cable insertion rack comprises a lower part (20) and an upper part (21) which are interconnected to each other.

11. The interconnection assembly according to claim 8, wherein the cable insertion rack of the second connector part (19) in the mounted position is interconnected to the fan-out element of the first connector part (9) by at least one fixing bolt (31).

12. The interconnection assembly according to claim 1, wherein the at least one antenna (4) is arranged in a recess (15) of the fan-out element in the area of the first port (10a, 11a) of the hollow conductor (10c, 11c).

13. The interconnection assembly according to claim 1 one of the preceding claims, wherein the at least one antenna (4) is arranged on a chip (2) and/or a printed circuit board (3).

14. The interconnection assembly according to claim 1, wherein the interconnection assembly (1) comprises a plurality of cables (5) arranged in a pattern.

15. The interconnection assembly according to claim 14, wherein two neighboring cables (5) are, with respect to a respective longitudinal axis (z), arranged 90° difference in signal polarisation with respect to each other.

16. The interconnection assembly according to claim 1, wherein the core (6) of the at least one cable (5) has a rectangular cross section.

17. The interconnection assembly according to claim 1, wherein the cable jacket (5a) of the at least one cable (5) is interconnected to the cable insertion rack of the second connector part (19).

18. The interconnection assembly according to claim 1, wherein an end of the at least one cable (5) is covered by an attachment sleeve (26).

19. The interconnection assembly according to claim 18, wherein the attachment sleeve (26) comprises an orientating means (27) to define the orientation of the cable with respect to its longitudinal axis (z).

20. The interconnection assembly according to claim 1, wherein the fan-out element is interconnected to a printed circuit board (3) by at least one bushing (8).

21. The interconnection assembly according to claim 20, wherein the bushing (8) is aligned with a structure on the printed circuit board (3).

* * * * *